(12) United States Patent
Cui et al.

(10) Patent No.: US 11,664,944 B2
(45) Date of Patent: May 30, 2023

(54) ELECTRONIC APPARATUS, RADIO COMMUNICATION METHOD AND COMPUTER-READABLE MEDIUM FOR DISCOVERY REFERENCE SIGNAL OPERATIONS

(71) Applicant: Sony Corporation, Tokyo (JP)

(72) Inventors: Tao Cui, Beijing (CN); Jianfei Cao, Beijing (CN)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 17/281,252

(22) PCT Filed: Oct. 25, 2019

(86) PCT No.: PCT/CN2019/113182
§ 371 (c)(1),
(2) Date: Mar. 30, 2021

(87) PCT Pub. No.: WO2020/088353
PCT Pub. Date: May 7, 2020

(65) Prior Publication Data
US 2022/0006580 A1  Jan. 6, 2022

(30) Foreign Application Priority Data

Nov. 2, 2018 (CN) .......................... 201811300670.X

(51) Int. Cl.
*H04L 27/26* (2006.01)
*H04L 5/00* (2006.01)
*H04W 56/00* (2009.01)

(52) U.S. Cl.
CPC .......... *H04L 5/0048* (2013.01); *H04L 5/0094* (2013.01); *H04L 5/0098* (2013.01); *H04L 27/2666* (2013.01); *H04W 56/00* (2013.01)

(58) Field of Classification Search
CPC ............ H04L 27/2613; H04L 27/2666; H04L 5/0048; H04L 5/0094; H04L 5/0098; H04L 27/26025; H04L 27/2656; H04W 56/00
See application file for complete search history.

(56) References Cited

U.S. PATENT DOCUMENTS 9,814,093 B2    11/2017  Um et al.
2021/0153107 A1*  5/2021  Xu ........................ H04W 72/04
(Continued)

FOREIGN PATENT DOCUMENTS

CN           108390747 A        8/2018

OTHER PUBLICATIONS

International Search Report and Written Opinion dated Jan. 16, 2020, received for PCT Application PCT/CN2019/113182, Filed on Oct. 25, 2019, 8 pages including English Translation.

(Continued)

*Primary Examiner* — Melvin C Marcelo
*Assistant Examiner* — Natali Pascual Peguero
(74) *Attorney, Agent, or Firm* — Xsensus LLP

(57) ABSTRACT

Disclosed are an electronic apparatus, a radio communication method and a computer-readable medium. The electronic apparatus for radio communication according to one embodiment comprises a processing circuit. The processing circuit is configured to: determine a time length of a sending window of a discovery reference signal based on a target number of candidate positions of a synchronous signal block of the discovery reference signal and a subcarrier spacing; and control the sending of the discovery reference signal based on the determined time length.

11 Claims, 14 Drawing Sheets

(56) References Cited

U.S. PATENT DOCUMENTS

2021/0297966 A1\* 9/2021 Noh .................... H04W 56/001
2021/0321331 A1\* 10/2021 Zhou ................. H04W 52/0216

OTHER PUBLICATIONS

LG Electronics, "RMSI Delivery and CORESET Configuration", 3GPP TSG RAN WG1 Meeting#91, R1-1719894, Nov. 27-Dec. 1, 2017, 15 pages.

\* cited by examiner

ELECTRONIC APPARATUS, RADIO COMMUNICATION METHOD AND COMPUTER-READABLE MEDIUM FOR DISCOVERY REFERENCE SIGNAL OPERATIONS

CROSS-REFERENCE TO RELATED APPLICATIONS

The present application is based on PCT filing PCT/CN2019/113182, filed Oct. 25, 2019, which claims priority to CN 201811300670.X, filed Nov. 2, 2018, the entire contents of each are incorporated herein by reference.

FIELD

The present application generally relates to the field of wireless communications, and in particular to an electronic device for wireless communication, a wireless communication method, and a computer readable medium.

BACKGROUND

Discovery reference signal (DRS) has been added in the 3rd Generation Partnership Project (3GPP) Rel-12 with respect to supporting basic functions of a small cell switch. In licensed assisted access (LAA) in 3GPP Rel-13, the main functions of DRS are still used, and the content of signals included in the DRS is increased.

In New Radio (NR), a primary synchronization signal (PSS), a secondary synchronization signal (SSS) and a physical broadcast channel (PBCH) form a synchronization signal block (SSB) as a part of the DRS.

SUMMARY

In the following, an overview of the embodiments of the present application is given simply to provide basic understanding to some aspects of the present application. It should be understood that this overview is not an exhaustive overview of the present application. It is not intended to define key part or important part of the present application, or limit a scope of the present application. The purpose is only to provide some concepts in a simplified form, as a preface of the subsequent detailed descriptions.

According to an embodiment, an electronic device for wireless communication includes processing circuitry, and the processing circuitry is configured to: determine, based on a target number of candidate positions for a synchronization signal block of a discovery reference signal and a subcarrier spacing, a duration of a transmission window of the discovery reference signal; and control transmission of the discovery reference signal based on the determined duration.

According to an embodiment, a wireless communication method includes: determining, based on a target number of candidate positions for a synchronization signal block of a discovery reference signal and a subcarrier spacing, a duration of a transmission window of the discovery reference signal; and controlling transmission of the discovery reference signal based on the determined duration.

According to an embodiment, an electronic device for wireless communication includes processing circuitry, and the processing circuitry is configured to: perform control to receive a discovery reference signal transmitted based on a duration of a transmission window, where the duration is determined based on a target number of candidate positions for a synchronization signal block of the discovery reference signal and a subcarrier spacing.

According to an embodiment, a wireless communication method includes: receiving a discovery reference signal transmitted based on a duration of a transmission window, where the duration is determined based on a target number of candidate positions for a synchronization signal block of the discovery reference signal and a subcarrier spacing.

According to an embodiment, an electronic device for wireless communication includes processing circuitry, and the processing circuitry is configured to: embed, in a synchronization signal block of a discovery reference signal, indication information related to a time offset of the synchronization signal block; and perform control to transmit the discovery reference signal.

According to an embodiment, a wireless communication method includes: embedding, in a synchronization signal block of a discovery reference signal, indication information related to a time offset of the synchronization signal block; and transmitting the discovery reference signal.

According to an embodiment, an electronic device for wireless communication includes processing circuitry, and the processing circuitry is configured to: perform control to receive a discovery reference signal, where a synchronization signal block of the discovery reference signal is embedded with indication information related to a time offset of the synchronization signal block; and determine, based on the indication information, a frame synchronization of the discovery reference signal.

According to an embodiment, a wireless communication method includes: receiving a discovery reference signal, where a synchronization signal block of the discovery reference signal is embedded with indication information related to a time offset of the synchronization signal block; and determining, based on the indication information, a frame synchronization of the discovery reference signal.

According to an embodiment, an electronic device for wireless communication includes processing circuitry, and the processing circuitry is configured to: perform control to transmit a discovery reference signal including multiple synchronization signal blocks, where the multiple synchronization signal blocks are transmitted in a manner that multiple transmit beams are in one-to-one correspondence to the multiple synchronization signal blocks.

According to an embodiment, a wireless communication method includes: transmitting a discovery reference signal including multiple synchronization signal blocks, where the multiple synchronization signal blocks are transmitted in a manner that multiple transmit beams are in one-to-one correspondence to the multiple synchronization signal blocks.

According to an embodiment, an electronic device for wireless communication includes processing circuitry, and the processing circuitry is configured to: perform control to receive a discovery reference signal including multiple synchronization signal blocks; and determine a correspondence between at least a part of the multiple synchronization signal blocks and transmit beams.

According to an embodiment, a wireless communication method includes: receiving a discovery reference signal including multiple synchronization signal blocks; and determining a correspondence between at least a part of the multiple synchronization signal blocks and transmit beams.

According to yet another embodiment, a computer readable medium is provided which includes executable instructions that, when executed by an information processing apparatus, cause the information processing apparatus to implement the methods described above.

Embodiments of the present application provide a solution for DRS on a NR unlicensed band, for example.

BRIEF DESCRIPTION OF THE DRAWINGS

The present application may be understood better with reference to the description provided in conjunction with drawings hereinafter. The same or similar reference numerals are used to indicate the same or similar components throughout the drawings. The drawings together with the detailed description below are incorporated in the specification and form a part of the specification, and are used to further illustrate preferable embodiments of the present application and explain the principle and advantages of the present application. In the accompanying drawings.

DETAILED DESCRIPTION OF THE EMBODIMENTS

Figure 1:
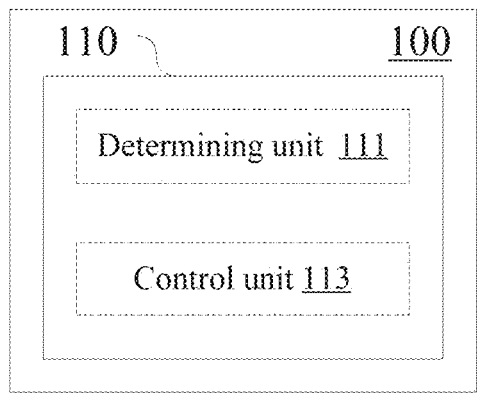
FIG. 1 is a block diagram showing a configuration example of an electronic device for wireless communication according to an embodiment of the present application.

The embodiments of the present application will be explained with reference to the drawings hereinafter. Elements and features described in one of the drawings or one embodiment of the present application may be combined with elements and features described in one or more other drawings or embodiments. It should be noted that representations and descriptions of components and processing which are irrelevant to the present application and known by those skilled in the art are omitted in the drawings and the specification for clarity.

An embodiment of the first aspect of the present application is directed to the determination of transmission duration of a discovery reference signal (DRS) on an unlicensed band. Before describing the embodiment, a transmission process of the DRS will be briefly explained with reference to FIG. 17.

Figure 17:
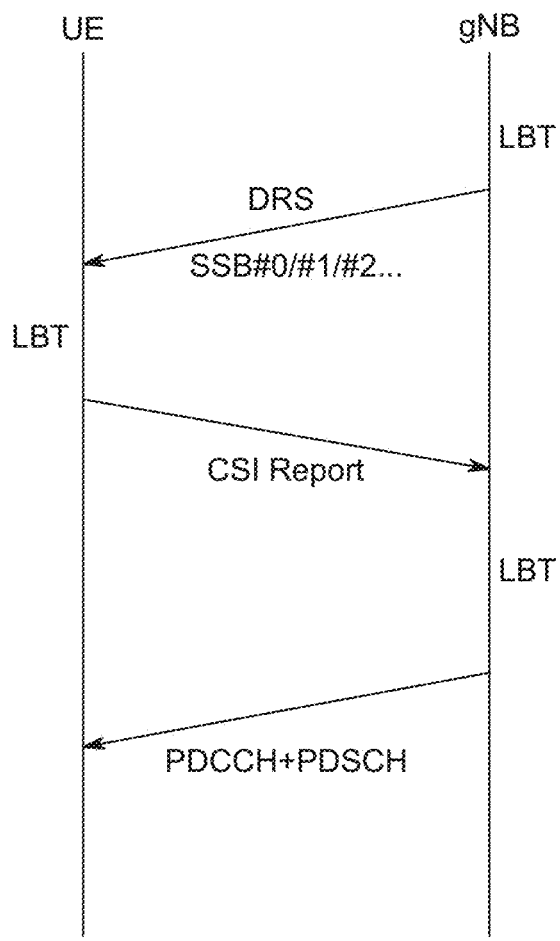
FIG. 17 is a schematic diagram showing a signaling interaction between a user equipment and a base station.

As shown in FIG. 17, a base station (gNB) first performs carrier sense (LBT) before transmitting a DRS. When a channel is idle, the gNB transmits the DRS including multiple SSBs such as SSB #0, SSB #1, SSB #2, and etc. Next, user equipment (UE) transmits, based on the detection of the DRS, a channel state indication (CSI) report to the gNB after the LBT. The gNB transmits, based on the CSI report of the UE, a physical downlink control channel (PDCCH) and a physical downlink shared channel (PDSCH) to the UE after the LBT.

Embodiments of the present application include a device and a method implemented on the base station side and a device and a method implemented on the user equipment side.

A configuration example of an electronic device for wireless communication according to an embodiment of the present application will be explained below with reference to FIG. 1. As shown in FIG. 1, an electronic device 100 for wireless communication according to the embodiment includes a processing circuitry 110, which may be implemented as a specific chip, a chipset, or a central processing unit (CPU), for example.

The processing circuitry 110 includes a determining unit 111 and a control unit 113. It should be noted that although the determination unit 111 and the control unit 113 are shown in a form of functional blocks in the drawings, it should be understood that functions of units may be implemented by the processing circuitry as a whole, and may be not necessarily implemented by discrete actual components in the processing circuitry. In addition, although the processing circuitry is shown by a block in the drawings, the electronic device may include multiple processing circuitries, and functions of the respective units may be distributed to the multiple processing circuitries, thereby cooperatively operating by the multiple processing circuitries to perform these functions.

An electronic device according to the embodiment is implemented on the base station side, for example.

The determining unit 111 is configured to determine, based on a target number of candidate positions for a SSB of a DRS and a subcarrier space (SCS), a duration of a transmission window of the DRS. In other words, the duration of a transmission window of the DRS is related to the maximum number of candidate positions for the SSB and the adopted subcarrier spacing. The greater the subcarrier spacing, the smaller the duration of a transmission window of the DRS may be set.

Figure 18:
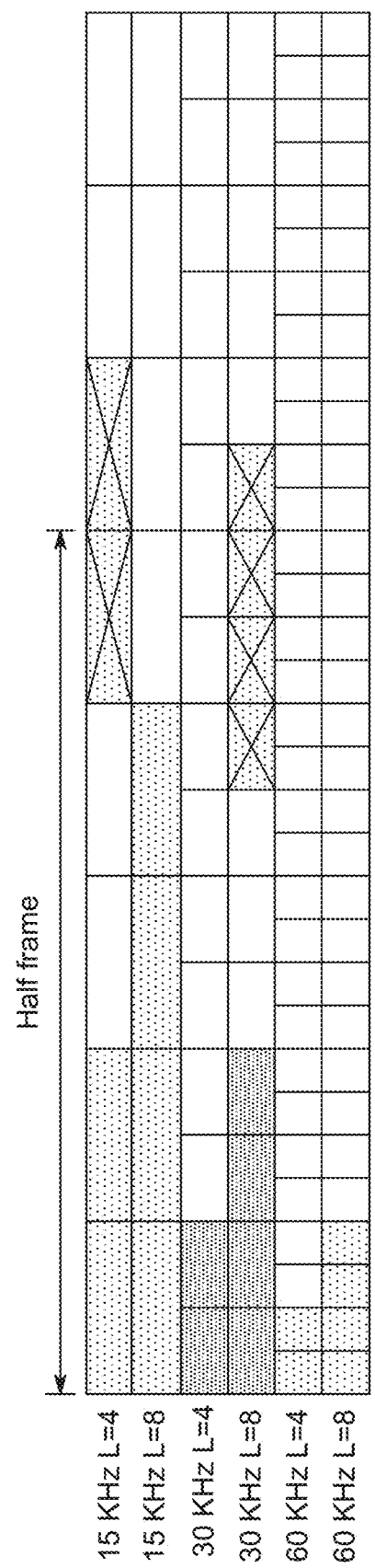
FIG. 18 is a schematic diagram for illustrating a transmission window of a discovery reference signal.

Here, the position of the SSB refers to the time domain position. FIG. 18 shows an arrangement example of the SSBs under different subcarrier spacings (15 KHz, 30 KHz, and 60 KHz), where L represents the maximum number of SSBs in a SSB cycle. In FIG. 18, the shaded block represents the position where the SSB is arranged.

It is beneficial to extend the maximum number of candidate positions for the SSB in transmission window of the DRS. For example, SSBs may be arranged more flexibly to improve resource utilization rate.

As an example but not a limitation, a target number of candidate positions for a SSB may be 64, for example.

The control unit 113 is configured to control transmission of the DRS based on the determined duration. More specifically, the control unit 113 may set the SSB at a position selected from the SSB candidate positions within the transmission window of the DRS for transmission.

Duration of a transmission window of a DRS may be determined by the determining unit 111 in various ways. According to an embodiment, the determining unit 111 may be configured to determine the duration of the transmission window to be a minimum duration capable of accommodating the target number of synchronization signal blocks at the subcarrier spacing.

As an example but not a limitation, in a case where a target number of candidate positions for a SSB is 64, for example: for a 15 KHz subcarrier spacing, a duration of a transmission window of the DRS may be set to 32 milliseconds; for a 30 KHz subcarrier spacing, a duration of a transmission window of the DRS may be set to 16 milliseconds; for a 60 KHz subcarrier spacing, a duration of a transmission window of the DRS may be set to 8 milliseconds.

SSB candidate positions which are extended can be obtained by appropriately setting duration of a transmission window of the DRS, so that a SSB can be arranged and transmitted in a more flexible manner to improve the transmission efficiency.

In licensed-assisted access using long term evolution (LAA-LTE), DRS transmission (with or without PDSCH) is limited to transmission duration of 1 millisecond and a LBT is required. However, for a NR operation below 7 GHz, the requirement that transmission duration of 1 millisecond is satisfied only in cases of a subcarrier spacing is 30 KHz, L=4, and a subcarrier spacing is 60 KHz, L=4/8, unless it is allowed to discard transmission of some SSBs, which allows truncation of a SSB burst set.

According to an embodiment of the present application, the determining unit 111 may also be configured to determine a duration of a DRS, that is, a transmission duration of the DRS.

According to an embodiment, the determining unit 111 may be configured to determine duration of a DRS to be in a fixed length. For example, for a NR operation below 7 GHz, duration of a DRS may be determined as 1 millisecond.

Correspondingly, the control unit 113 may be configured to allow part of SSBs to be discarded during transmission of a DRS.

According to another embodiment, the determining unit 111 may be configured to determine the maximum value of a duration of a DRS. For example, for a NR operation below 7 GHz and a subcarrier spacing of 15 KHz, the maximum value of the duration of the DRS may be set to 4 milliseconds.

In addition, one or more values may be pre-configured as candidates for the maximum value of the duration of the DRS, and the determining unit 111 may select one of the candidates as the maximum value of the duration of the DRS.

The control unit 113 may be configured to transmit the DRS in duration within the determined maximum value.

According to yet another embodiment, the determining unit 111 may be configured to determine transmission duration of a DRS according to subcarrier spacing. More specifically, duration of the DRS is determined to be a minimum duration capable of accommodating a preset number of SSBs at the subcarrier spacing.

For example, in a case of a preset number of SSB is 8, for a 15 KHz subcarrier spacing, a duration of a DRS may be set to 4 milliseconds; for a 30 KHz subcarrier spacing, the duration of the DRS may be set to 2 milliseconds; for a 60 KHz subcarrier spacing, the duration of the DRS may be set to 1 millisecond.

In the case of arranging and transmitting the SSB in a more flexible manner, it is necessary to consider questions about determining a time offset of the SSB in a frame and determining frame synchronization according to the detected SSB. Next, a configuration example of an electronic device for wireless communication according to another embodiment of the present application will be illustrated with reference to FIG. 2.

Figure 2:
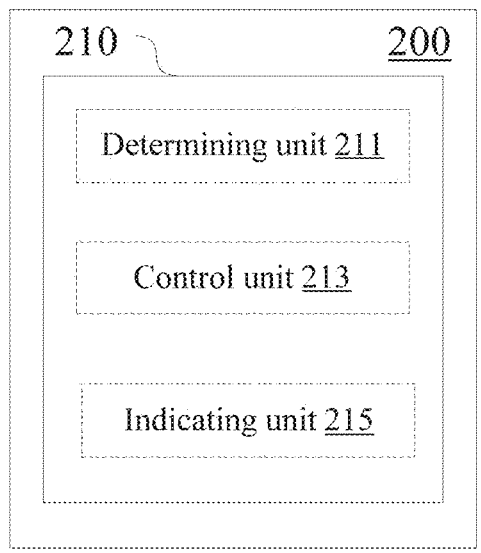
FIG. 2 is a block diagram showing a configuration example of an electronic device for wireless communication according to another embodiment of the present application.

As shown in FIG. 2, an electronic device 200 according to the embodiment includes a processing circuitry 210. The processing circuitry 210 includes a determining unit 211, a controlling unit 213, and an indicating unit 215. The functional configuration of the determining unit 211 and the controlling unit 213 are similar to that of the determining unit 111 and the controlling unit 113 described earlier with reference to FIG. 1.

The indicating unit 215 is configured to embed, in a SSB, indication information related to a time offset of the SSB.

For example, the indication information of the time offset may be embedded in a PBCH of the SSB.

To enable a UE to determine frame synchronization, for example, indication information such as system frame number (SFN) and half-frame bit are embedded in a PBCH. By further embedding indication information about a time offset of SSB, even in case of the time offset has occurred in SSB, the UE can determine a frame boundary based on the system frame number, half-frame bit, and information indicating the time offset, that is, the frame synchronization is performed.

According to an embodiment, a SSB may be offset with different granularities.

Correspondingly, indication information related to a time offset of the SSB may indicate the time offset in different time units, such as symbol, non-slot (i.e., mini-slot), SSB, time slot or half-frame.

FIG. 19 shows an example of a time offset of a SSB is performed in different granularities.

Figure 19A:
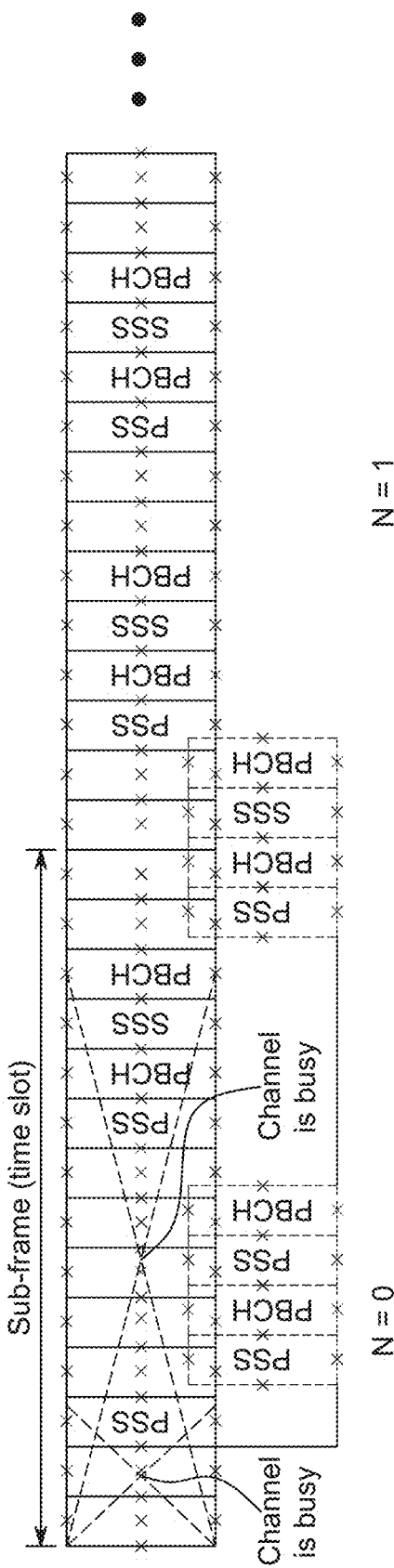
FIG. 19 is a schematic diagram for illustrating a time offset of a synchronization signal block.

FIG. 19(a) shows an example of a time offset of a SSB is performed in units of symbol. For example, the SSB may be offset by one or more symbols when a LBT at the current SSB position fails.

By performing a time offset of a SSB in units of symbol, it is beneficial to realize full use of time-frequency resources, reduce transmission delay, and perform channel access faster.

Figure 19B:
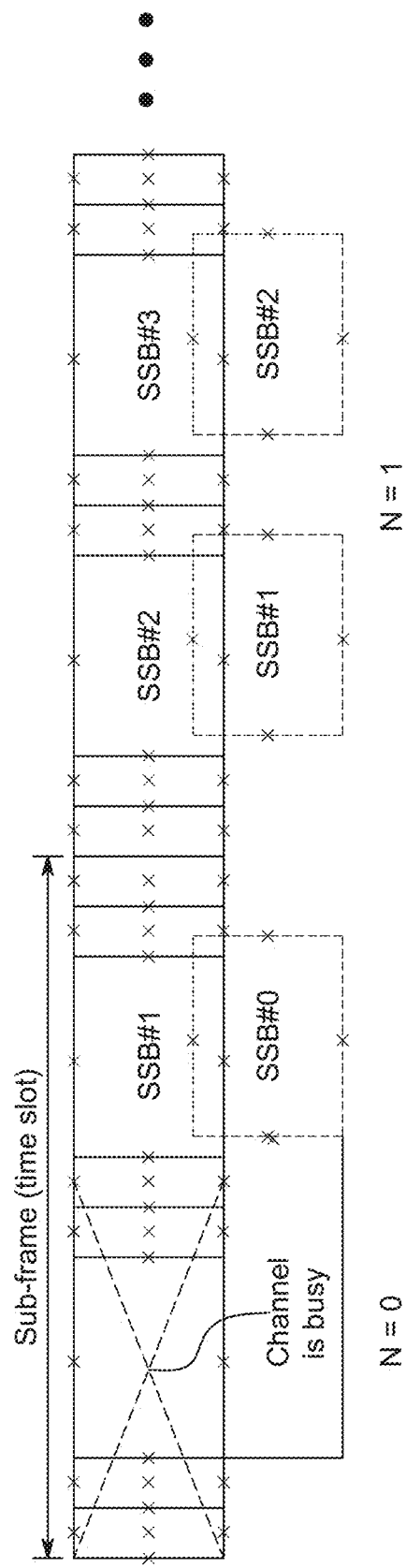

FIG. 19(b) shows an example of a time offset of a SSB is performed in units of SSB. For example, the SSB may be offset to next SSB candidate position when a LBT at the current SSB position fails.

By performing a time offset of a SSB in units of SSB, there is no need to change the pattern of the SSB, and candidate positions of the SSB can be fully utilized.

Figure 19C:
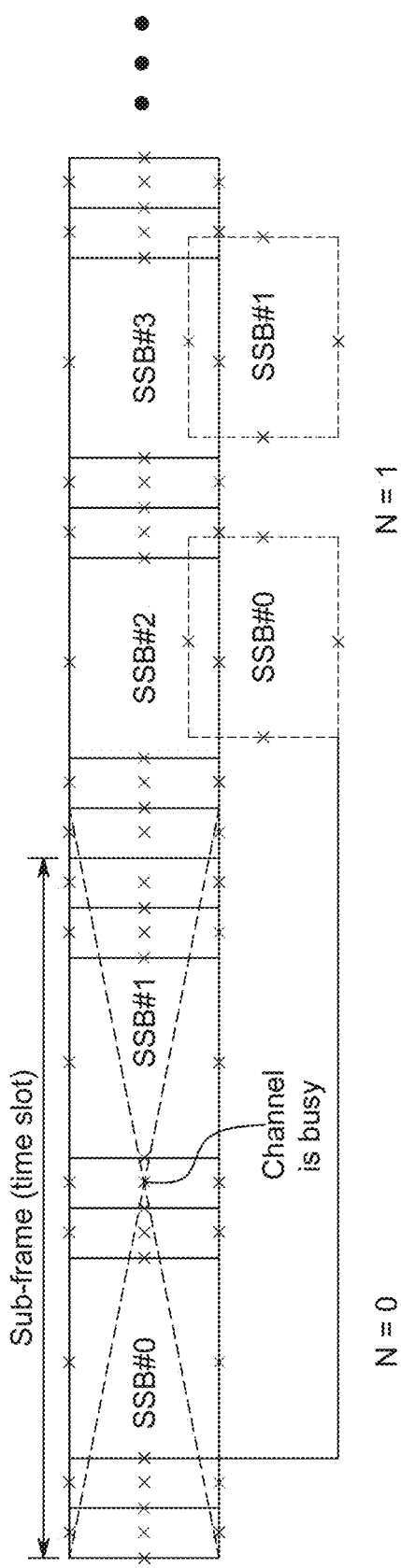

FIG. 19(c) shows an example of a time offset of a SSB is performed in units of time slot. For example, the SSB may be offset to next time slot when a LBT at the current time slot fails.

By performing a time offset of a SSB in units of time slot, there is no need to change the pattern of the SSB, and indication information of the time offset can be simplified (SSB #0 is always associated with a time slot boundary).

Figure 19D:
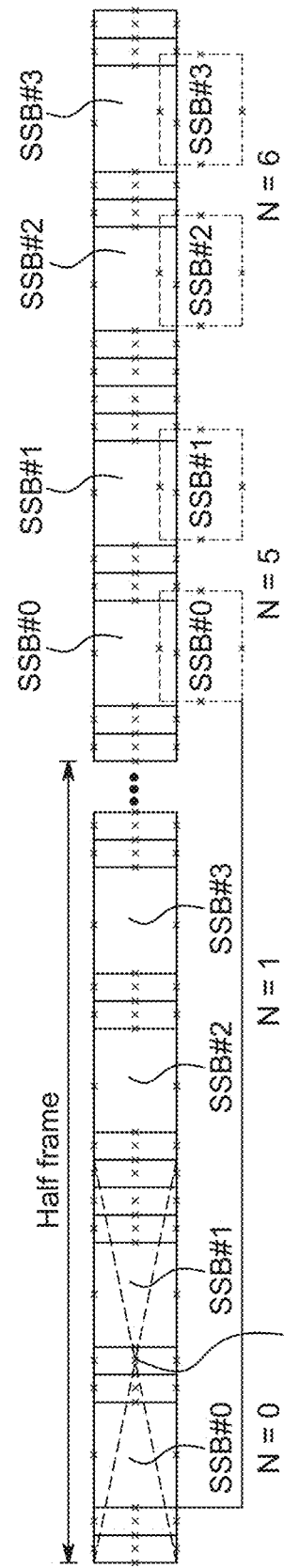

FIG. 19(d) shows an example of a time offset of a SSB is performed in units of half frame. For example, the SSB may be offset to next half frame when a LBT at the current half frame fails.

By performing a time offset of a SSB in units of half frame, there is no need to change the pattern of the SSB and the effective load of a PBCH.

In addition, under certain settings, a UE may expect that a SSB transmission in a SSB burst group in a DRS does not cross a half frame boundary.

Referring to FIG. 18, a SSB transmission marked "X" is not expected to occur.

Correspondingly, according to an embodiment, the control unit 213 may be configured to set a time offset of a SSB, so that the SSB does not cross a half frame boundary.

In addition, a base station may perform transmission of a DRS through multiple beams. According to an embodiment, the control unit 113/213 may be configured to transmit multiple SSBs in a manner that multiple transmit beams are in one-to-one correspondence to the multiple SSBs.

Figure 20A:
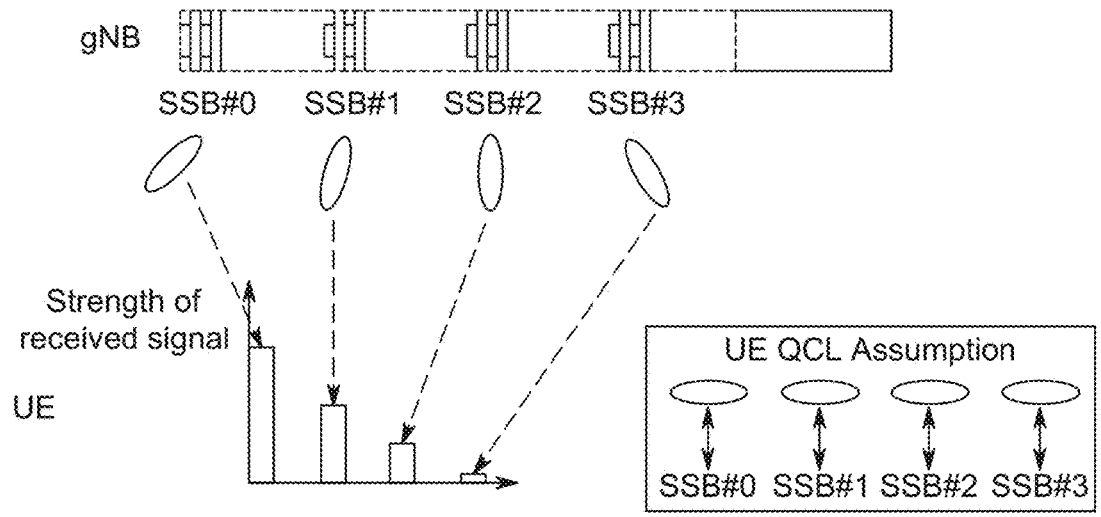
FIG. 20A and FIG. 20B are schematic diagrams for illustrating a correspondence between synchronization signal blocks and transmit beams.

Referring to FIG. 20A, the base station transmits SSB #0 through beam 0 (Beam0), transmits SSB #1 through beam 1 (Beam1), transmits SSB #2 through beam 2 (Beam2), and transmits SSB #3 through beam 3 (Beam3).

The correspondence between the SSBs and beams may be used by the UE to perform quasi-colocation (QCL) assumption. As shown in FIG. 20A, the UE may perform QCL assumption based on the correspondences between beam 0 and SSB #0, beam 1 and SSB #1, beam 2 and SSB #2, and beam 3 and SSB #3, respectively.

A QCL is a briefly described here. Even if two signals are transmitted from two different antennas, channels experienced by the two signals still have many common large-scale characteristics. Correspondingly, the concept of QCL for antenna port is included in NR, that is, if two wire ports are designated as quasi-colocated, receiving side may assume that wireless channels corresponding to the two antenna ports have similar large-scale characteristics.

In addition, a beam indication may be based on a transmission configuration indication (TCI). Each TCI state may include information about a reference signal (channel state indication—reference signal CSI-RS or SSB). By associating a specific downlink transmission (PDCCH or PDSCH) with a specific TCI, the network may inform user equipment that it can assume that a downlink transmission is performed using the same spatial filter as the associated reference signal of the TCI.

In the above description of an electronic device for wireless communication according to an embodiment of the present application, apparently, some methods and procedures are also disclosed. Next, a description of a wireless communication method according to an embodiment of the present application will be given without repeating the details that have been described above.

Figure 3:
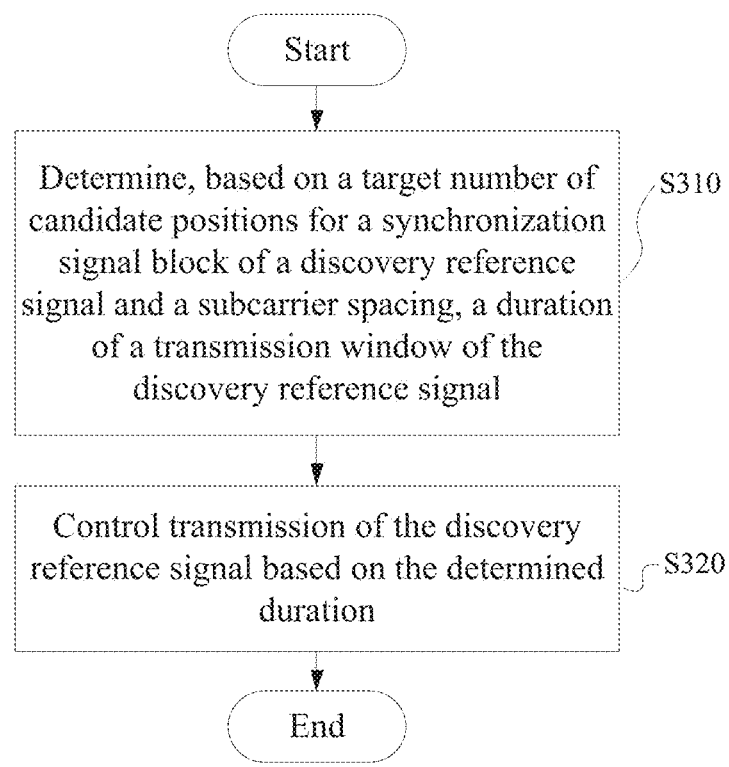
FIG. 3 is a flowchart showing a process example of a wireless communication method according to an embodiment of the present application.

As shown in FIG. 3, a method for wireless communication according to an embodiment includes a step S310 of determining, based on a target number of candidate positions for a synchronization signal block of a discovery reference signal and a subcarrier spacing, a duration of a transmission window of the discovery reference signal. In addition, the method further includes a step S320 of controlling transmission of the discovery reference signal based on the determined duration.

Embodiments of the device and method on the base station side are described above. In addition, embodiments of the present application further include embodiments for the user equipment side. Next, a description of embodiments of a device and a method for the user equipment side will be given without repeating details corresponding to details that have been described above.

Figure 4:
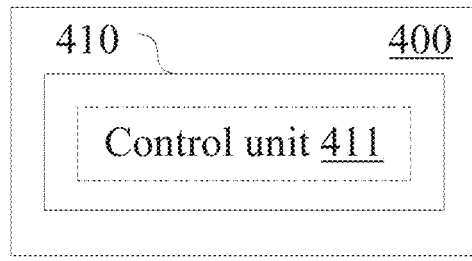
FIG. 4 is a block diagram showing a configuration example of an electronic device for wireless communication according to an embodiment of the present application.

As shown in FIG. 4, an electronic device 400 for wireless communication according to an embodiment includes a processing circuitry 410. The processing circuitry 410 includes a controlling unit 411 configured to perform control to receive a discovery reference signal transmitted based on a duration of a transmission window, where the duration of the transmission window is determined based on a target number of candidate positions for a synchronization signal block of the discovery reference signal and a subcarrier spacing.

Figure 5:
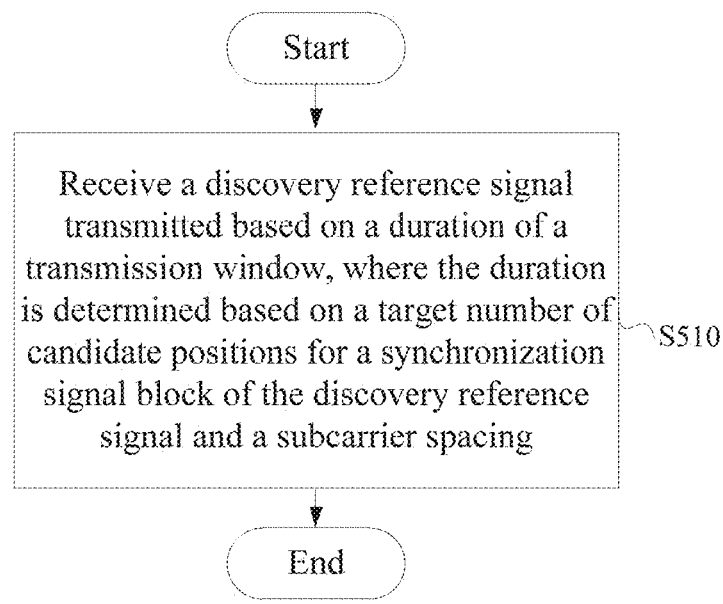
FIG. 5 is a flowchart showing a process example of a wireless communication method according to an embodiment of the present application.

As shown in FIG. 5, a method for wireless communication according to an embodiment includes a step S510 of receiving a discovery reference signal transmitted based on a duration of a transmission window, where the duration of the transmission window is determined based on a target number of candidate positions for a synchronization signal block of the discovery reference signal and a subcarrier spacing.

In addition, the foregoing embodiments contain contents of multiple aspects of the present application, and these aspects may be implemented in combination or independently.

Next, a description of embodiments of a device and a method according to another aspect of the present application will be given without repeating details corresponding to details that have been described above.

Figure 6:
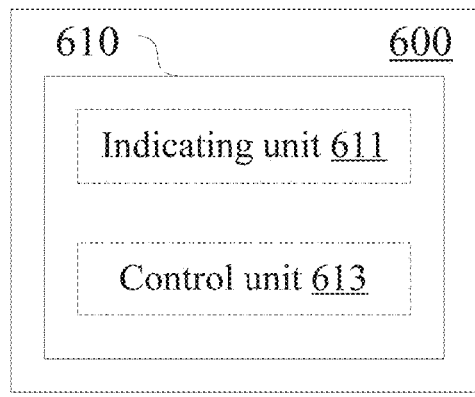
FIG. 6 is a block diagram showing a configuration example of an electronic device for wireless communication according to an embodiment of the present application.

FIG. 6 shows a configuration example of an electronic device for wireless communication according to an embodiment, which may be implemented on the base station side.

As shown in FIG. 6, the electronic device 600 includes a processing circuitry 610. The processing circuitry 610 includes an indicating unit 611 and a controlling unit 613.

The indicating unit 611 is configured to embed, in a synchronization signal block of a discovery reference signal, indication information related to a time offset of the synchronization signal block.

The control unit 613 is configured to perform control to transmit the discovery reference signal.

Figure 7:
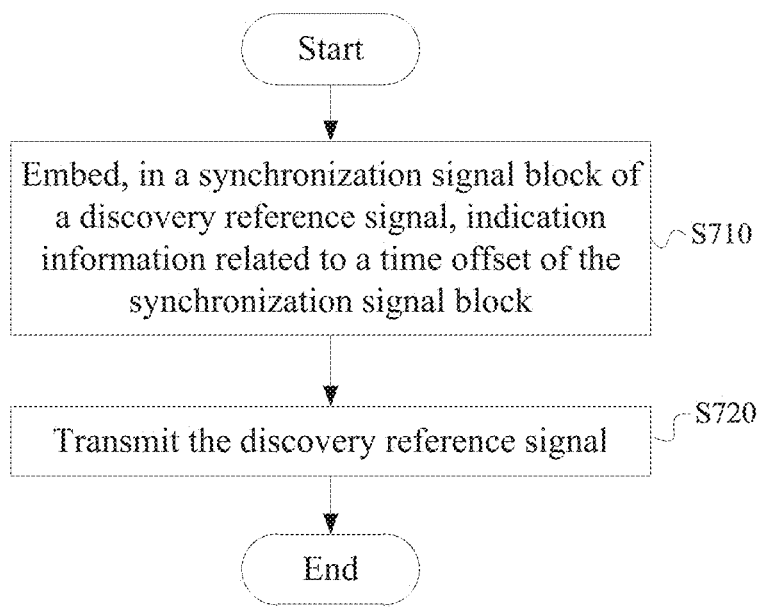
FIG. 7 is a flowchart showing a process example of a wireless communication method according to an embodiment of the present application.

FIG. 7 shows a process example of a corresponding method for wireless communication. As shown in FIG. 7, a method for wireless communication according to an embodiment includes a step S710 of embedding, in a synchronization signal block of a discovery reference signal, indication information related to a time offset of the synchronization signal block, and a step S720 of transmitting the discovery reference signal.

Figure 8:
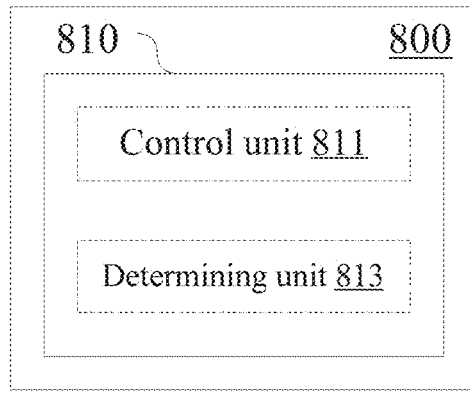
FIG. 8 is a block diagram showing a configuration example of an electronic device for wireless communication according to an embodiment of the present application.

FIG. 8 shows a configuration example of an electronic device for wireless communication according to an embodiment, which may be implemented on the user equipment side.

As shown in FIG. 8, the electronic device 800 includes a processing circuitry 810. The processing circuitry 810 includes a controlling unit 811 and a determining unit 813.

The controlling unit 811 is configured to perform control to receive a discovery reference signal, where a synchronization signal block of the discovery reference signal is embedded with indication information related to a time offset of the synchronization signal block.

The determining unit 813 is configured to determine, based on the indication information, a frame synchronization of the discovery reference signal.

Figure 9:
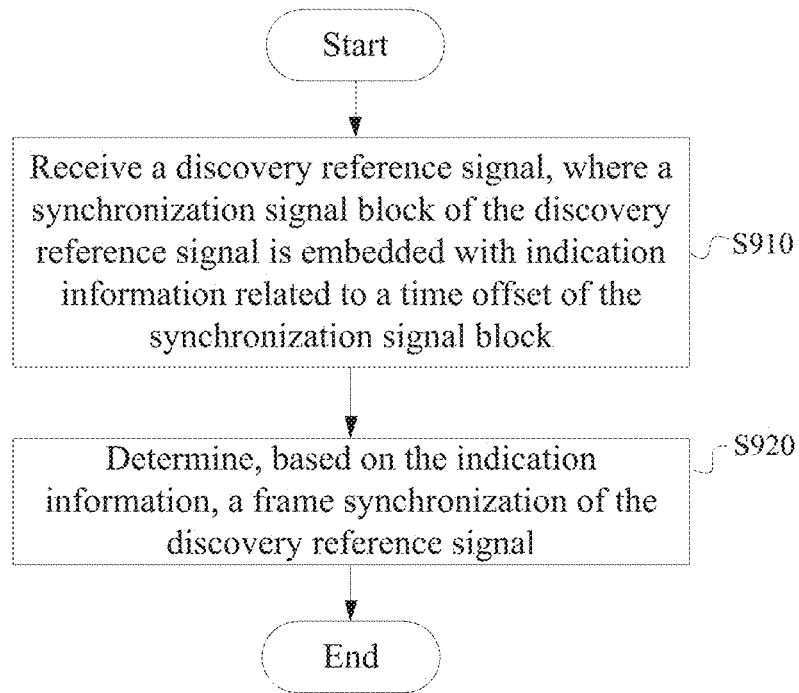
FIG. 9 is a flowchart showing a process example of a wireless communication method according to an embodiment of the present application.

FIG. 9 shows a process example of a corresponding method for wireless communication. As shown in FIG. 9, a method for wireless communication according to an embodiment includes a step S910 of receiving a discovery reference signal, where a synchronization signal block of the discovery reference signal is embedded with indication information related to a time offset of the synchronization signal block. The method further includes a step S920 of determining, based on the indication information, a frame synchronization of the discovery reference signal.

Next, a description of embodiments of a device and a method according to another aspect of the present application will be given without repeating details corresponding to details that have been described above.

Figure 10:
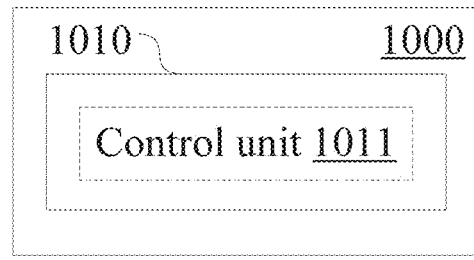
FIG. 10 is a block diagram showing a configuration example of an electronic device for wireless communication according to an embodiment of the present application.

FIG. 10 shows a configuration example of an electronic device for wireless communication according to an embodiment, which may be implemented on the base station side.

As shown in FIG. 10, the electronic device 1000 includes a processing circuitry 1010. The processing circuitry 1010 includes a controlling unit 1011.

The controlling unit 1011 is configured to perform control to transmit a discovery reference signal including multiple synchronization signal blocks. The controlling unit 1011 is configured to transmit multiple synchronization signal blocks in a one-to-one correspondence between the multiple transmission beams and the multiple synchronization signal blocks.

Figure 11:
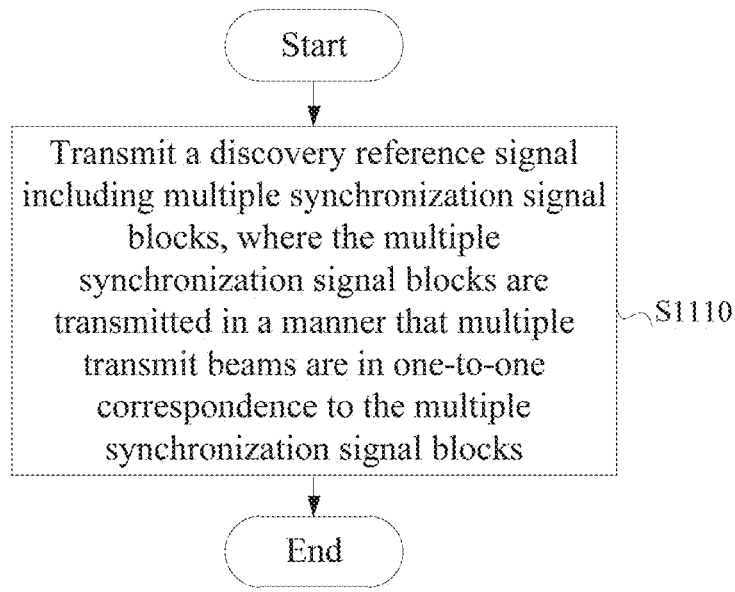
FIG. 11 is a flowchart showing a process example of a wireless communication method according to an embodiment of the present application.

FIG. 11 shows a process example of a corresponding method for wireless communication. As shown in FIG. 11, a method for wireless communication according to an embodiment includes a step S1110 of transmitting a discovery reference signal including multiple synchronization signal blocks. In step S1110, the multiple synchronization signal blocks are transmitted in a manner that multiple transmit beams are in one-to-one correspondence to the multiple synchronization signal blocks.

Figure 12:
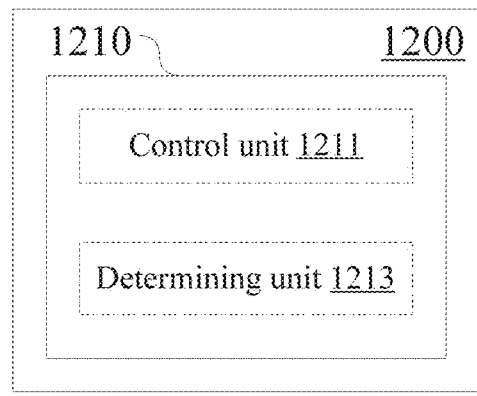
FIG. 12 is a block diagram showing a configuration example of an electronic device for wireless communication according to an embodiment of the present application.

FIG. 12 shows a configuration example of an electronic device for wireless communication according to an embodiment, which may be implemented on the user equipment side.

As shown in FIG. 12, the electronic device 1200 includes a processing circuitry 1210. The processing circuitry 1210 includes a controlling unit 1211 and a determining unit 1213.

The control unit 1211 is configured to perform control to receive a discovery reference signal including multiple synchronization signal blocks.

The determining unit 1213 is configured to determine a correspondence between at least a part of the multiple synchronization signal blocks and transmit beams. For example, the determined correspondence may be used by the UE for QCL assumption.

More specifically, the determining unit 1213 may determine the correspondence based on the strength of received signal.

Reference is made back to FIG. 20A, strength of received signal of beam 0, beam 1, beam 2, and beam 3 are shown in the figure (the strength is only a schematic representation). For example, when a UE receives SSB #0 through the strongest beam, the UE can determine the correspondence between SSB #0 and beam0.

The determining unit 1213 may only determine the correspondence between a part of beams and SSB. For example, the correspondence between several beams with the strongest strength of received signal and SSB may be determined.

In addition, according to an embodiment, the determining unit 1213 may be configured to update, based on the preset correspondence and according to the received synchronization signal block, the correspondence.

For example, a UE can update its QCL assumption to perform TCI state indication of a CSI-RS resources based on SSB receiving in DRS.

Figure 20B:
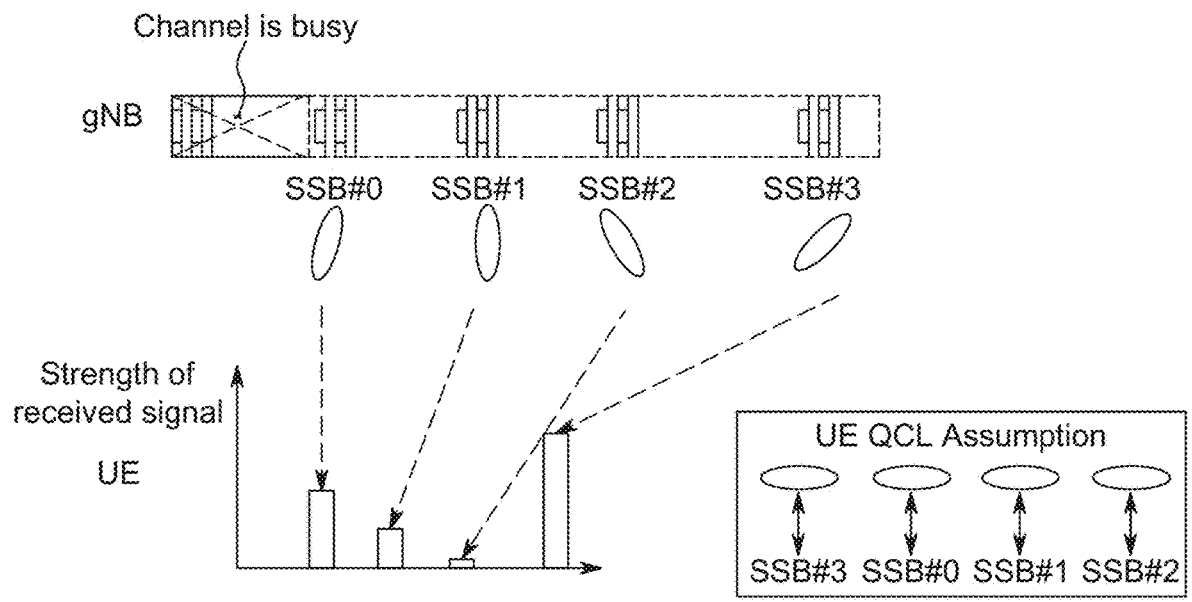

It is assumed that a preset correspondence maintained at the UE is shown in FIG. 20A. The preset correspondence may be determined through previous measurement, or may be preset by the UE. In the case of acquiring the result shown in FIG. 20B by measuring of the received signal, the UE can update the specified relationship between SSB and beam as beam 0 corresponds to SSB #3, beam 1 corresponds to SSB #0, and beam 2 corresponds to SSB #1 and beam 3 corresponds to SSB #2.

Figure 13:
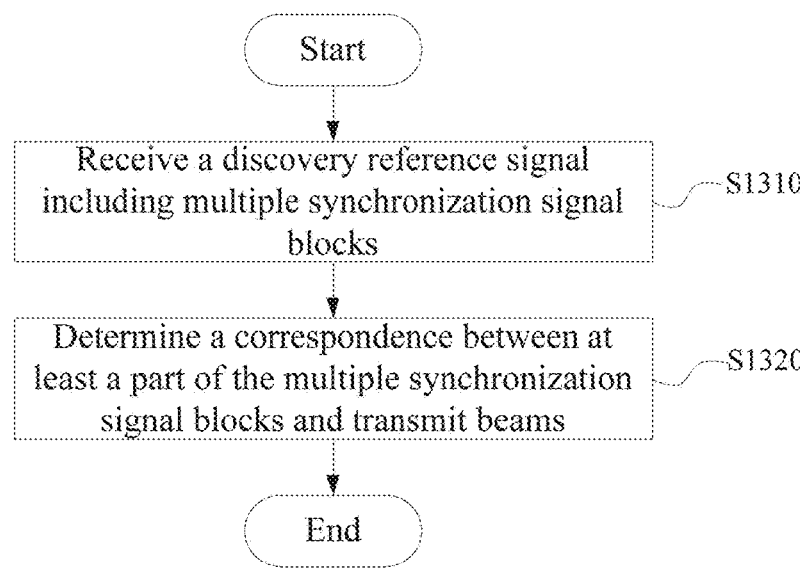
FIG. 13 is a flowchart showing a process example of a wireless communication method according to an embodiment of the present application.

FIG. 13 shows a process example of a corresponding method for wireless communication. As shown in FIG. 13, a method for wireless communication according to an embodiment includes a step S1310 of receiving a discovery reference signal including multiple synchronization signal blocks. In addition, the method further includes a step S1320 of determining a correspondence between at least a part of the multiple synchronization signal blocks and transmit beams.

In addition, the embodiments of the present application further includes a computer readable medium which includes executable instructions that, when executed by an information processing equipment, cause the information processing apparatus to implement the method described above.

As an example, various steps of the methods above and various modules and/or units of the devices above may be implemented as software, firmware, hardware or a combination thereof. In a case of implementing by software or firmware, programs constituting the software for implementing the methods above are installed to a computer with a dedicated hardware structure (for example, a general-purpose computer 14 shown in FIG. 14) from the storage medium or the network. The computer can perform various functions when installed with various programs.

Figure 14:
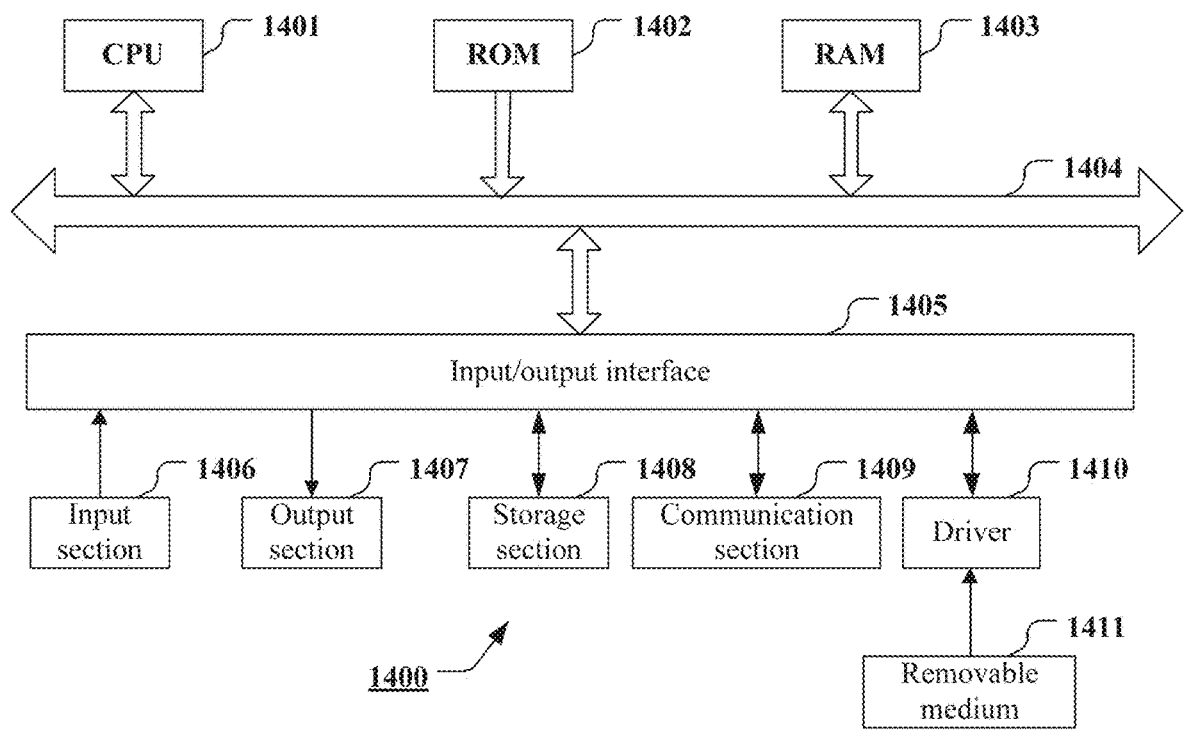
FIG. 14 is a block diagram showing an exemplary structure of a computer for implementing the method and device according to the present application.

In FIG. 14, a central processing unit (i.e., a CPU) 1401 executes various processes in accordance with a program stored in a read only memory (ROM) 1402 or a program loaded from a storage section 1408 to a random access memory (RAM) 1403. The data needed for the various processing of the CPU 1401 may be stored in the RAM 1403 as needed. The CPU 1401, the ROM 1402 and the RAM 1403 are connected to each other via a bus 1404. An input/output interface 1405 is also connected to the bus 1404.

The following components are linked to the input/output interface 1405: an input section 1406 (including a keyboard, and a mouse and so on), an output section 1407 (including a display, for example a cathode ray tube (CRT) and a liquid crystal display (LCD), and a loudspeaker), a storage section 1408 (including a hard disk and so on), and a communication section 1409 (including a network interface card for example a LAN card, and a modem). The communication section 1409 performs communication processing via a network such as the Internet. The driver 1410 may also be linked to the input/output interface 1405 as needed. A removable medium 1411 such as a magnetic disk, an optical disk, a magneto-optical disk, and a semiconductor memory is mounted on the driver 1410 as needed, so that a computer program read from the removable medium 1411 is installed into the storage section 1408 as needed.

In a case of performing the series of processing described above by software, programs constituting the software are installed from the network for example the Internet or the storage medium, for example, the removable medium 1411.

Those skilled in the art should understand that the storage medium is not limited to the removable medium 1411 shown in FIG. 14 that stores the program and is distributed separately from the device so as to provide the program to the user. Examples of the removable medium 1411 include: a magnetic disk (including a floppy disk (registered trademark)), an optical disk (including a compact disk read only memory (CD-ROM) and a digital versatile disk (DVD)), a magnetic-optical disk (including a mini disk (MD) (registered trademark)), and a semiconductor memory. Alternatively, the storage medium may be the ROM 1402, a hard disk included in the storage portion 1408 or the like. The storage medium has a program stored therein and is distributed to the user together with a device in which the storage medium is included.

A program product storing machine readable instruction codes is further provided according to an embodiment of the present application. The instruction codes can perform the method according to the above embodiments of the present application when read and executed by a machine.

Correspondingly, a storage medium for carrying the program product in which machine-readable instruction codes are stored is also provided in the present application. The storage medium includes, but is not limited to, soft disk, optical disk, magnetic optical disk, memory card, memory stick and the like.

The embodiments of the present application may further relate to the following electronic device. In a case that the electronic device is used for a base station side, the electronic device may be implemented as any type of gNB, evolved node B (eNB), such as a macro eNB and a small eNB. The small eNB such as a pico eNB, a micro eNB and a home (femto-cell) eNB may have a smaller coverage range than a macro cell. Alternatively, the electronic device may also be implemented as any types of base stations, such as a NodeB and a base transceiver station (BTS). The electronic device may include: a body configured to control wireless communications (which is also referred to as a base station device); and one or more remote radio heads (RRH) located at positions different from the body. In addition, various types of terminals, which will be described below, may each operate as the base station by temporarily or semi-persistently executing a base station function.

In a case that the electronic device is used for a user equipment side, the electronic device may be implemented as a mobile terminal (e.g. a smart phone, a tablet personal computer (PC), a notebook PC, a portable game terminal, a portable/dongle mobile router and a digital camera) or an in-vehicle terminal (e.g. a car navigation device). In addition, the electronic device may be a wireless communication module (e.g. an integrated circuitry module including a single die or multiple dies) mounted on each of the terminals described above.

Application Example for a Terminal Device

Figure 15:
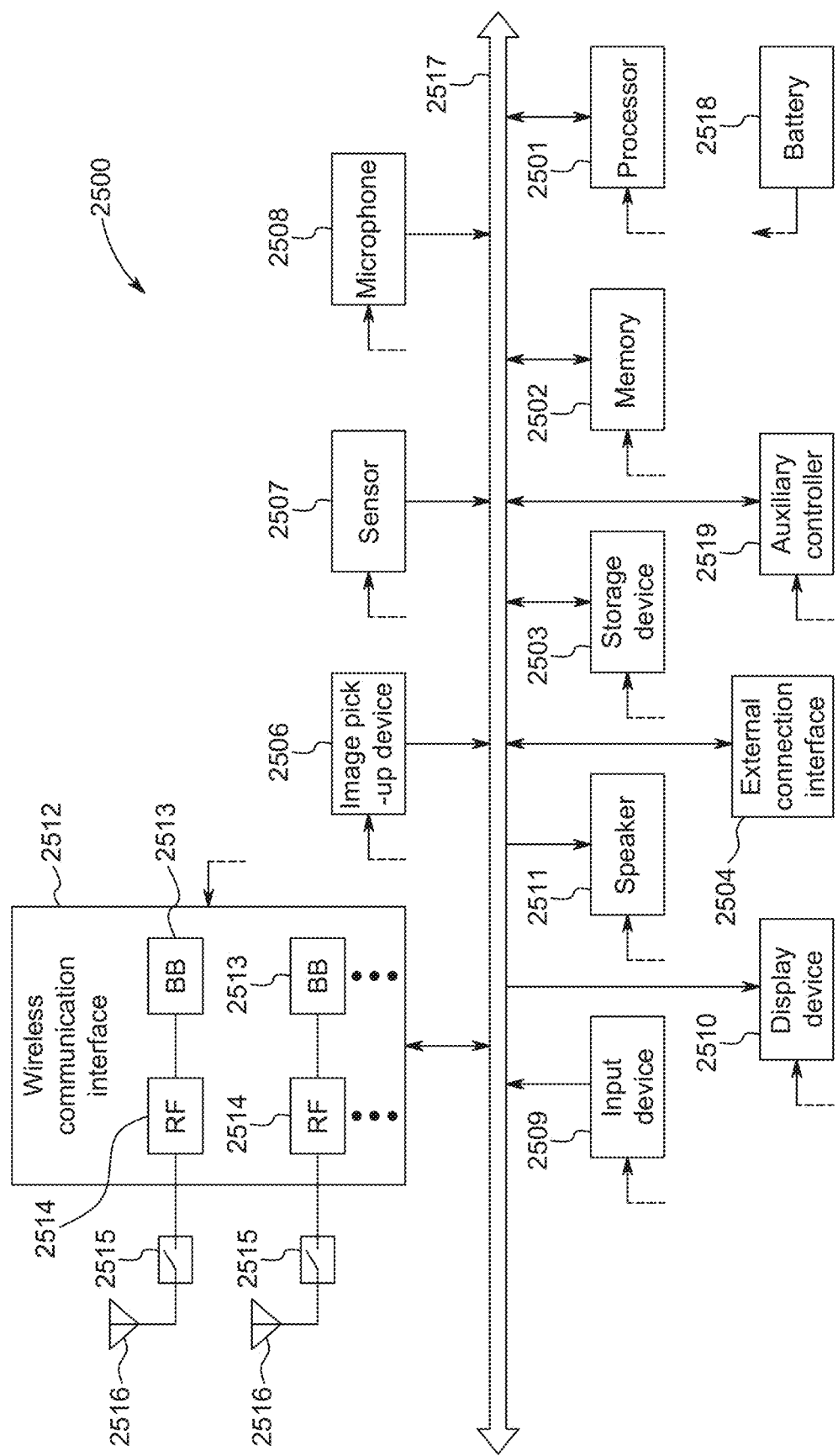
FIG. 15 is a block diagram showing an example of an illustrative configuration of a smart phone to which a technology according to the present application can be applied.

FIG. 15 is a block diagram illustrating an example of exemplary configuration of a smartphone 2500 to which the technology of the present application may be applied. The smart phone 2500 includes a processor 2501, a memory 2502, a storage device 2503, an external connection interface 2504, an image pick-up device 2506, a sensor 2507, a microphone 2508, an input device 2509, a display device 2510, a speaker 2511, a wireless communication interface 2512, one or more antenna switches 2515, one or more antennas 2516, a bus 2517, a battery 2518 and an auxiliary controller 2519.

The processor 2501 may be, for example, a CPU or a system on chip (SoC), and controls functions of an application layer and another layer of the smart phone 2500. The memory 2502 includes a RAM and a ROM, and stores data and programs executed by the processor 2501. The storage device 2503 may include a storage medium such as a semiconductor memory and a hard disk. The external connection interface 2504 is an interface for connecting an external device (such as a memory card and a universal serial bus (USB) device) to the smart phone 2500.

The image pick-up device 2506 includes an image sensor (such as a charge coupled device (CCD) and a complementary metal oxide semiconductor (CMOS)), and generates a captured image. The sensor 2507 may include a group of sensors such as a measurement sensor, a gyro sensor, a geomagnetic sensor, and an acceleration sensor. The microphone 2508 converts sounds that are inputted to the smart phone 2500 into audio signals. The input device 2509 includes, for example, a touch sensor configured to detect touch onto a screen of the display device 2510, a keypad, a keyboard, a button, or a switch, and receive an operation or information inputted from a user. The display device 2510 includes a screen such as a liquid crystal display (LCD) and an organic light-emitting diode (OLED) display, and displays an output image of the smart phone 2500. The speaker 2511 converts audio signals that are outputted from the smart phone 2500 to sounds.

The wireless communication interface 2512 supports any cellular communication scheme such as LTE and LTE-Advanced, and performs radio communication. The wireless communication interface 2512 may typically include, for example, a baseband (BB) processor 2513 and a radio frequency (RF) circuit 2514. The BB processor 2513 may execute for example coding/decoding, modulation/demodulation and multiplexing/de-multiplexing, and execute various types of signal processing for wireless communications. Meanwhile, the RF circuit 2514 may include for example a mixer, a filter and an amplifier, and transmits and receives a wireless signal via an antenna 2516. The wireless communication interface 2512 may be a chip module having the BB processor 2513 and the RF circuit 2514 integrated thereon.

As shown in FIG. 15, the wireless communication interface 2512 may include multiple BB processors 2513 and multiple RF circuits 2514. Although FIG. 15 illustrates the example in which the wireless communication interface 2512 includes the multiple BB processors 2513 and the multiple RF circuits 2514, the wireless communication interface 2512 may also include a single BB processor 2513 or a single RF circuit 2514.

In addition to the cellular communication scheme, the wireless communication interface 2512 may support an additional type of wireless communication scheme, such as a short-distance wireless communication scheme, a near field communication scheme and a wireless local area network (LAN) scheme. In this case, the wireless communication interface 2512 may include the BB processor 2513 and the RF circuit 2514 for each radio communication scheme.

Each of the antenna switches 2515 switches connection destinations of the antennas 2516 among multiple circuits (such as circuits for different radio communication schemes) included in the wireless communication interface 2512.

Each of the antennas 2516 includes a single or multiple antenna elements (such as multiple antenna elements included in an MIMO antenna), and is used for the wireless communication interface 2512 to transmit and receive radio signals. The smart phone 2500 may include the multiple antennas 2516, as shown in FIG. 15. Although FIG. 15 illustrates the example in which the smart phone 2500 includes the multiple antennas 2516, the smart phone 2500 may also include a single antenna 2516.

Furthermore, the smartphone 2500 may include antennas 2516 for each radio communication scheme. In this case, the antenna switches 2515 may be omitted from the configuration of the smart phone 2500.

The bus 2517 connects the processor 2501, the memory 2502, the storage 2503, the external connection interface 2504, the image pick-up device 2506, the sensor 2507, the microphone 2508, the input device 2509, the display device 2510, the speaker 2511, the wireless communication interface 2512, and the auxiliary controller 2519 to each other. The battery 2518 supplies power to blocks of the smart phone 2500 illustrated in FIG. 15 via feeder lines, which are partially shown as dashed lines in the figure. The auxiliary controller 2519 operates a minimum necessary function of the smart phone 2500, for example, in a sleep mode.

In the smartphone 2500 shown in FIG. 15, a transceiver device of the wireless communication device on the user equipment side according to an embodiment of the present application may be implemented by the wireless communication interface 2512. At least a part of the functions of the processing circuitry and/or each unit of the electronic device or the wireless communication device at the user equipment side according to the embodiment of the present application may also be implemented by the processor 2501 or the auxiliary controller 2519. For example, the auxiliary controller 2519 may perform a part of functions of the processor 2501, to reduce power consumption of the battery 2518. In addition, the processor 2501 or the auxiliary controller 2519 may perform, by executing a program stored in the memory 2502 or the storage device 2503, at least part of the functions of the processing circuitry and/or each unit of the electronic device or the wireless communication device at the user equipment side according to the embodiment of the present application.

Application Examples for a Base Station

Figure 16:
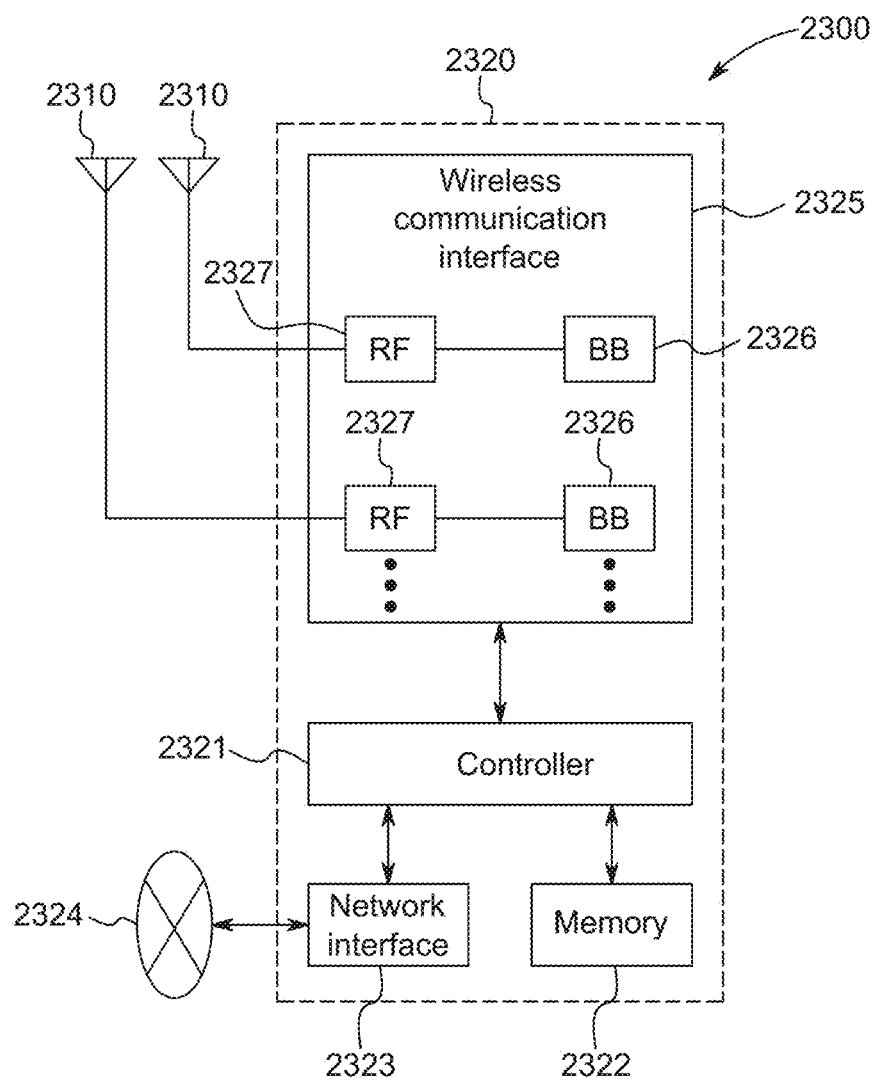
FIG. 16 is a block diagram showing an example of a schematic configuration of a gNB to which the technology of the present application may be applied.

FIG. 16 is a block diagram showing an example of a schematic configuration of a gNB to which the technology according to the present application may be applied. A gNB 2300 includes one or more antennas 2310 and a base station device 2320. Each of the antennas 2310 is connected to the base station device 2320 via a radio frequency (RF) cable.

Each of the antennas 2310 includes one or more antenna elements (such as multiple antenna elements included in a multiple-input multiple-output (MIMO) antenna), and is used for transmitting and receiving a radio signal by the base station device 2320. The gNB 2300 may include multiple antennas 2310, as illustrated in FIG. 16. For example, the multiple antennas 2310 may be compatible with multiple frequency bands used by the gNB 2300. Although FIG. 16 illustrates an example in which the gNB 2300 includes the multiple antennas 2310, the gNB 2300 may also include a single antenna 2310.

The base station device 2320 includes a controller 2321, a memory 2322, a network interface 2323 and a radio communication interface 2325.

The controller 2321 may be, for example, a CPU or a DSP, and operate various functions of the higher layer of the base station device 2320. For example, the controller 2321 generates a data packet based on the data in the signal processed by the radio communication interface 2325 and communicates the generated packet via the network interface 2323. The controller 2321 may bind data from multiple baseband processors to generate a binding packet and transfer the generated binding packet. The controller 2321 may have a logic function that performs, for example, radio resource control, wireless bearer control, mobility management, admission control, and scheduling. The control may be performed in combination with a nearby gNB or core network node. The memory 2322 includes RAM and ROM, and stores a program that is executed by the controller 2321, and various types of control data (such as a terminal list, transmission power data, and scheduling data).

The network interface 2323 is a communication interface for connecting the base station device 2320 to a core network 2324. The controller 2321 may communicate with the core network node or another gNB via the network interface 2323. In this case, the gNB 2300 may be connected with the core network node or another gNB via a logic interface (such as an Si interface and an X2 interface). The network interface 2323 may be a wired communication interface or a radio communication interface for wireless backhaul routing. If the network interface 2323 is a wireless communication interface, the network interface 2323 may use a higher frequency band for wireless communication than a frequency band used by the wireless communication interface 2325.

The wireless communication interface 2325 supports any cellular communication scheme (such as long term evolution (LTE) and LTE-advanced), and provides a wireless connection to a terminal located in a cell of the gNB 2300 via an antenna 2310. The wireless communication interface 2325 may generally include, for example, a BB processor 2326 and an RF circuit 2327. The BB processor 2326 may perform for example encoding/decoding, modulating/demodulating and multiplexing/de-multiplexing, and perform various types of signal processing of layers (such as L1, medium access control (MAC), radio link control (RLC) and packet data convergence protocol (PDCP)). Instead of the controller 2321, the BB processor 2326 may have a part or all of the above logic functions. The BB processor 2326 may be a memory storing communication control programs, or a module including a processor and a related circuit which are configured to execute programs. The programs may be updated to change the function of the BB processor 2326.

The module may be a card or blade inserted into the slot of the base station device 2320. Alternatively, the module may be a chip installed on the card or the blade. Meanwhile, the RF circuit 2327 may include for example a mixer, a filter or an amplifier, and transmits and receives a radio signal via the antenna 2310.

As shown in FIG. 16, the wireless communication interface 2325 may include multiple BB processors 2326. For example, the multiple BB processors 2326 may be compatible with multiple frequency bands used by the gNB 2300. The radio communication interface 2325 may include multiple RF circuits 2327, as illustrated in FIG. 16. For example, the multiple RF circuits 2327 may be compatible with the multiple antenna elements. Although FIG. 16 shows an example in which the wireless communication interface 2325 includes the multiple BB processors 2326 and the multiple RF circuits 2327, the wireless communication interface 2325 may also include a single BB processor 2326 or a single RF circuit 2327.

In the gNB 2300 shown in FIG. 16, the transceiver device of the wireless communication device at the base station side according to the embodiment of the present application may be implemented by the wireless communication interface 2325. At least a part of the functions of the processing circuitry and/or each unit of the electronic device or the wireless communication device at the base station side according to the embodiment of the present application may also be implemented by the controller 2321. For example, the controller 2321 may perform, by executing a program stored in the memory 2322, at least part of the functions of the processing circuitry and/or each unit of the electronic device or the wireless communication device at the base station side according to the embodiment of the present application.

In the above description of specific embodiments of the present application, features described and/or illustrated for one embodiment may be used in one or more other embodiments in the same or similar manner, or may be combined with features in other embodiments, or may replace features in other embodiments. The features in are combined or substituted for features in other embodiments.

It is be noted that, terms "including/comprising" used herein refer to existing of features, elements, steps or components, but existing or adding of one or more other features, elements, steps or components is not excluded.

In the above embodiments and examples, references numerals consist of numbers are used to represent steps and/or units. It will be understood by those of ordinary skill in the art that these reference numerals are for purpose of illustration and drawing and are not indicative of the order or any other limitations thereof.

In addition, the method of the present application is not limited to being executed in the chronological order described in the specification, or may be executed in other chronological order, in parallel or independently. Therefore, the order of execution of the method described in this specification does not limit the technical scope of the present application.

While the invention has been described above by the specific embodiments of the invention, it should be understood that all embodiments and examples described above are not restrictive but illustrative. Various modifications, improvements and equivalents can be made to the invention by those skilled in the art within the scope and spirit of accompanying claims. These modifications, improvements or equivalents should fall within the scope of protection of the invention.

The invention claimed is:

1. An electronic device for wireless communication, comprising processing circuitry configured to:
   determine a duration of a transmission window of a discovery reference signal, wherein the duration of the transmission window is determined based on each of:
   a subcarrier spacing, and
   a target number of candidate positions for a synchronization signal block of the discovery reference signal; and
   control transmission of the discovery reference signal based on the determined duration.

2. The electronic device according to claim 1, wherein the processing circuitry is configured to:
   determine the duration of the transmission window to be a minimum duration capable of accommodating the target number of synchronization signal blocks at the subcarrier spacing.

3. The electronic device according to claim 1, wherein the processing circuitry is further configured to determine a duration of the discovery reference signal.

4. The electronic device according to claim 3, wherein the processing circuitry is configured to:
   determine the duration of the discovery reference signal to be in a fixed length, and
   allow part of the synchronization signal block to be discarded during transmission of the discovery reference signal.

5. The electronic device according to claim 3, wherein the processing circuitry is configured to:
   determine a maximum value of the duration of the discovery reference signal, and
   perform transmission of the discovery reference signal in a duration within the maximum value.

6. The electronic device according to claim 3, wherein the processing circuitry is configured to:
   determine the duration of the discovery reference signal to be a minimum duration capable of accommodating a preset number of synchronization signal blocks at the subcarrier spacing.

7. The electronic device according to claim 1, wherein the processing circuitry is further configured to:
   embed, in the synchronization signal block, indication information related to a time offset of the synchronization signal block.

8. The electronic device according to claim 7, wherein the indication information indicates the time offset in units of symbol, non-slot, synchronization signal block, time slot, or half frame.

9. The electronic device according to claim 7, wherein the processing circuitry is further configured to:
   set the time offset so that the synchronization signal block does not cross a half frame boundary.

10. The electronic device according to claim 1, wherein the transmission of the discovery reference signal comprises:
    transmitting a plurality of synchronization signal blocks in a manner that a plurality of transmit beams are in one-to-one correspondence to the plurality of synchronization signal blocks.

11. A method performed by an electronic device configured for wireless communication and comprising processing circuitry, the method comprising:
    determining a duration of a transmission window of a discovery reference signal, wherein the duration of the transmission window is determined based on each of:
a subcarrier spacing, and
a target number of candidate positions for a synchronization signal block of the discovery reference signal; and
transmitting the discovery reference signal based on the determined duration.

* * * * *